Sept. 17, 1968   K. N. REID, JR   3,401,983
VEHICLE BRAKE CONTROL
Filed Jan. 24, 1967   2 Sheets-Sheet 1

INVENTOR.
KARL N. REID, JR.
BY
Cameron, Kerkam & Sutton
ATTORNEYS

United States Patent Office 3,401,983
Patented Sept. 17, 1968

3,401,983
VEHICLE BRAKE CONTROL
Karl N. Reid, Jr., Stillwater, Okla., assignor to Henriette L. Williams, Elizabeth W. Bullard, and Ann W. Flowers, Vicksburg, Miss., executors of Allison R. Williams, deceased
Filed Jan. 24, 1967, Ser. No. 611,275
7 Claims. (Cl. 303—21)

ABSTRACT OF THE DISCLOSURE

Control of applied fluid braking pressure during braked vehicle deceleration according to the value of the slip ratio $$\frac{V_t - V_r}{V_t}$$

where $V_t$ is the vehicle translational velocity and $V_r$ is the wheel rotational velocity.

---

This invention relates to control of the braking process that occurs on application of the wheel brakes of a moving vehicle, so as to maintain optimum braking conditions between the wheel and the vehicle supporting surface during the stopping transient, i.e., that period of changing conditions during which the vehicle decelerates and comes to a stop.

Heretofore, various brake control systems have been devised with the general objective of relieving the brake pressure in case of undue slippage between the wheel and the supporting surface, so as to reduce wear and tear on the wheel surface (often a rubber tire tread) and to minimize the hazards of skidding, which often has disastrous consequences.

For example, U.S. Patent No. 2,529,985, granted Nov. 14, 1950, to Allison R. Williams disclosed a control system in which two accelerometers, responsive respectively and independently to linear and angular wheel accelerations (i.e., negative accelerations or decelerations), produced equal and opposite counteracting signals as long as true rolling contact was maintained between the wheel and its supporting surface. In the case of slippage on the application of the brakes, however, the angular acceleration signal predominated and a significant difference between the two signals was used to proportionately reduce the brake pressure. In fluid pressure brake systems, this can be done conveniently by means of bleeding the fluid pressure line to the brake. Various arrangements were proposed for obtaining and comparing the two signals, both electrical and mechanical or hydromechanical.

In later related patents, such as No. 2,920,924, granted Jan. 12, 1960 to James B. Reswick and Allison R. Williams, additional provision was made for a bleed valve having enough lap that the valve did not begin to open until after a desired predetermined range of rate of change of slippage (10–15%) was reached.

While similar to such prior brake control systems in the use of a fluid pressure bleed valve, the present invention is predicated on the new concept of regulating the position of the valve according to the value of a "slip ratio," a function which is identified hereinafter by the letter S and defined as $$S = \frac{V_t - V_r}{V_t} \quad (1)$$

where $V_t$=translational velocity of an appropriate point on the vehicle (generally the linear velocity of the vehicle at the axis of rotation of a braked wheel or at the center of gravity of the vehicle).

$V_r$=rotational velocity of a braked wheel in contact with its supporting surface, defined as the product of angular velocity of the wheel, $\omega$, and the effective radius of the wheel, $r$; it is implied here that the wheel actually makes a "footprint" on its supporting surface.

Figure 1:
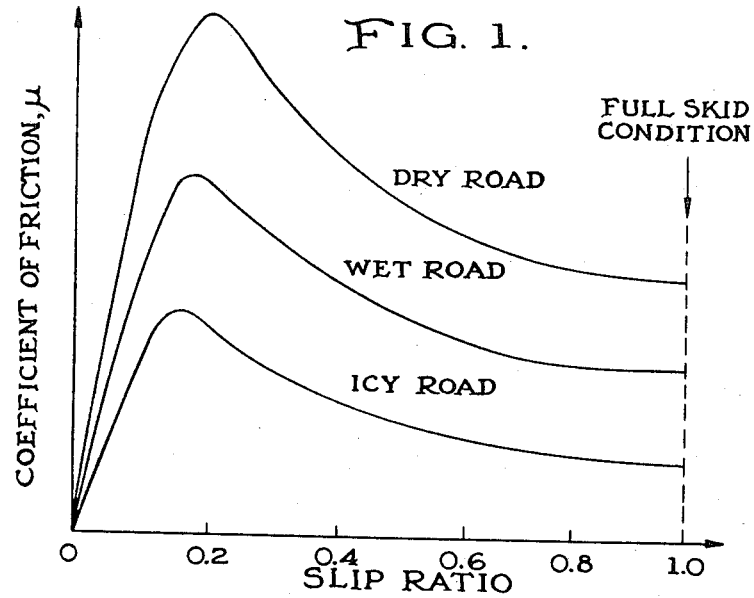
Figure 2:
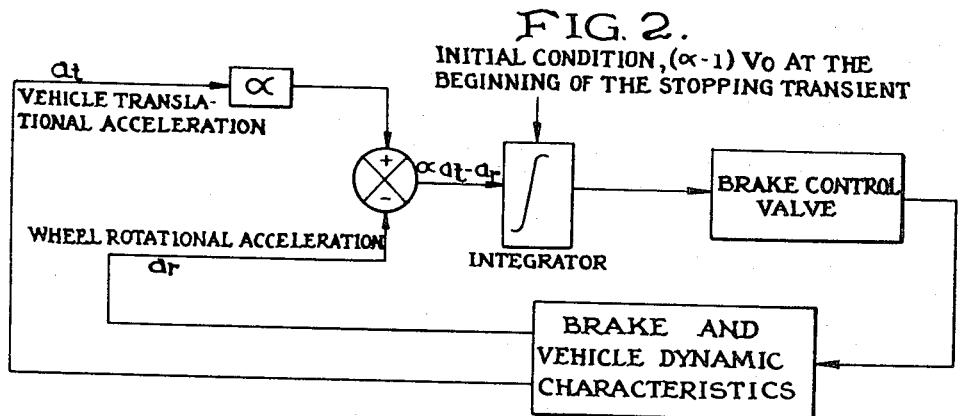
Figure 3:
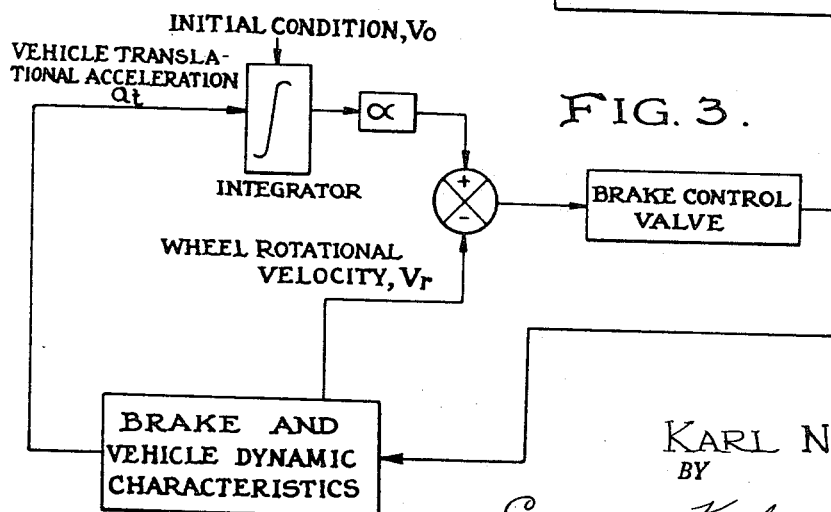
Figure 4:
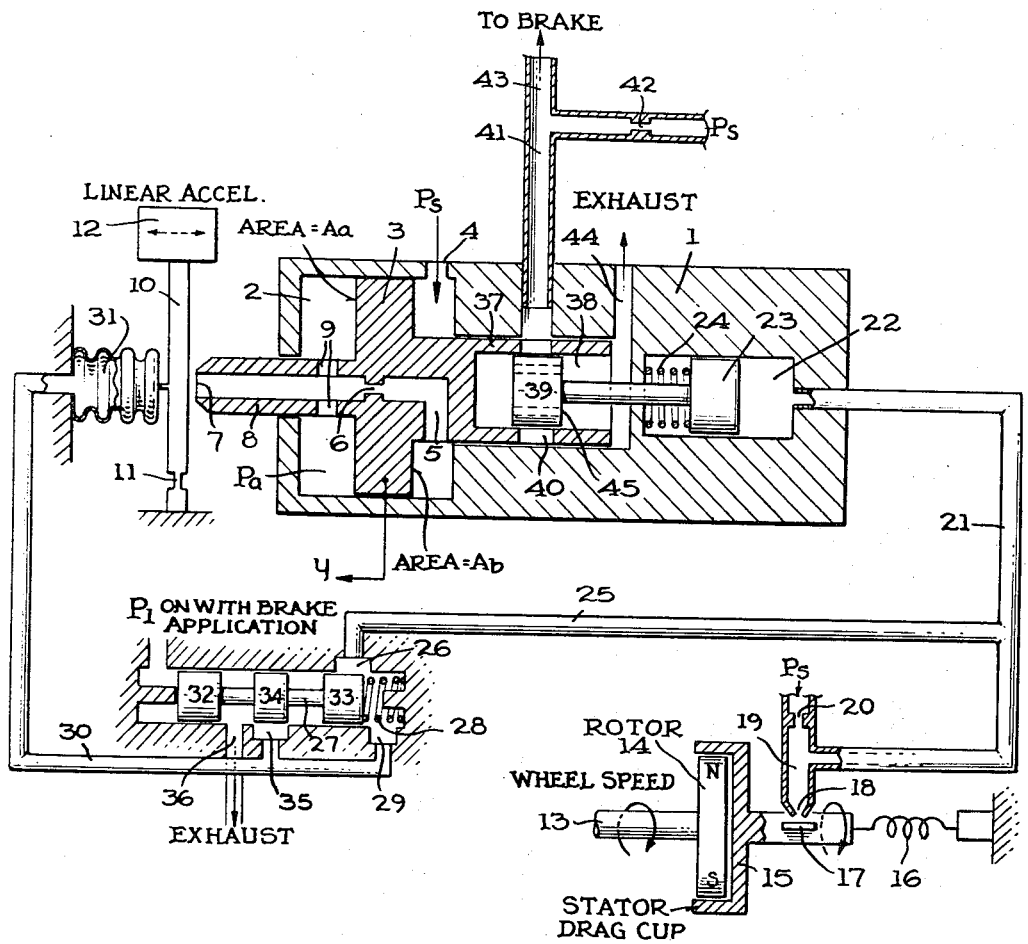

This new method of brake control has very important advantages over the prior art briefly set forth above, which can be explained more clearly by reference to the accompanying drawings in which FIG. 1 shows typical variations in the coefficient of friction between the wheel tread and its supporting surface when plotted against slip ratio S;

FIGS. 2 and 3 are schematic illustrations of the principal components of control systems based on the slip ratio method; and FIG. 4 illustrates schematically one form of fluid-mechanical control system based on the slip ratio method and embodying the invention.

As disclosed in prior patents, it appears that the coefficient of friction between a rubber vehicle tire and its supporting surface reaches a maximum value at a certain degree of slippage (depending to some extent on operating conditions). It can be seen that this maximum determines the optimum value of the slip ratio S in any given case.

It has now been determined, as shown by the typical curves in FIG. 1, that this optimum value of S is approximately the same for widely differing road conditions, as shown by a comparison of the points on the horizontal axis at which the peaks of the curves occur. In other words, the optimum value of S for such varying conditions is approximately constant, and slip ratio can be set equal to a constant $k$ for optimum results:

$$\frac{V_t - V_r}{V_t} = k$$

or $$V_t(1-k) - V_r = 0 \quad (2)$$

Under the typical conditions illustrated by FIG. 1, the value of $k$ should be in the range of $0 < k < 0.2$ and preferably close to but not exceeding the peak value for the average condition.

It is assumed that $V_t = V_r$ at the instant of application of the brakes, and it will be seen that a control system which enforces Equation 2 thereafter, as rapidly as possible consistent with the control dynamics, with proper regard to the initial conditions ($V_{t0}$ and $V_{r0}$) existing when the system is activated, will produce an optimum stopping transient. There are two general schemes for implementing such a control system:

(a) Integrated acceleration difference

This system is shown schematically in FIG. 2. In this system, accelerometers are used to sense the vehicle translational acceleration and wheel rotational acceleration. A proportioned difference between these accelerations is taken, the result is integrated taking into account the initial condition when the system is activated, and the resulting proportioned velocity difference is used to control the brake pressure. If $V_r$ is too high, the brake pressure is proportionately increased and if $V_r$ is too low, the brake pressure is proportionately reduced. Thus, the control system will tend to bring about the condition expressed by Equation 2 in the form, $$\int (\alpha \dot{V}_t - \dot{V}_r) dt + (\alpha - 1) V_0 = 0 \quad (3)$$

where $\alpha$ is a constant equal to $(1-k)$ and the initial velocity $V_0 \equiv V_{t0} = V_{r0}$. The acceleration signals, algebraic summing operation, and integration may be in any medium (i.e., mechanical, hydraulic, electrical, etc.).

(b) Integrated vehicle acceleration system

Another general scheme which is preferred for most purposes is shown schematically in FIG. 3. This system uses an accelerometer to measure the translational vehicle acceleration. This signal is integrated with suitable attention to the initial condition and multiplied by the constant $\alpha$. The wheel rotational velocity signal, which is directly measured with a tachometer or the like, is then subtracted from the modified vehicle translational velocity signal and the resulting signal used to control the brake pressure.

In equation form, this control system tends to bring about the condition, $$\alpha[\int \dot{V}_t dt + V_{t0}] - V_r = 0 \quad (4)$$

Again, the operations may be accomplished in any medium.

The present invention relates to a brake control system based on the slip ratio method explained above and controlled by fluid pressures proportional to appropriate functions of vehicular motion appearing in Equations 3 and 4. These proportional fluid pressures can be obtained most readily by maintaining a source of fluid supply under a substantially constant pressure $P_s$ and supplying this fluid to a fixed orifice and then to a variable orifice located downstream relative to the fixed orifice. With such an arrangement, the pressure between the two orifices depends upon the setting of the variable orifice and can be made proportional to the particular function of vehicular motion which is to be utilized.

In particular, the integrating operation is performed according to the present invention by a piston movable in accordance with a variable control pressure proportional to the vehicle translational acceleration, or in other words, proportional to the first term of Equation 3 or Equation 4 (that is, the terms including $\dot{V}_t$), as the case may be. The movement of this piston in response to variations in the control pressure represents an approximate integration of the vehicle translational acceleration with respect to time, as required by the first term of both Equations 3 and 4. Then a second piston or the like is moved in accordance with the second term (that is, terms including $V_r$) of the equation to be solved.

The alegbraic summing operation required by both Equation 3 and Equation 4 can be performed by any suitable mechanical summing means, generally speaking. For present purposes, however, it is preferable to employ a brake pressure control valve having two parts, one movable in accordance with each of the piston elements or, in other words, in accordance with each of the terms of the equation to be solved. As long as these valve parts move together and no relative movement between them takes place, the equation is satisfied and the valve has no effect on brake operating pressure. Whenever this condition is disturbed and one valve part moves relatively to the other, however, a valve port is opened so as to bleed off some of the brake operating pressure and this tends to restore the system to its original condition.

FIG. 4 shows by way of example a fluid-mechanical system of the type generally described above and arranged to operate in accordance with Equation 4. The control unit comprises a body, preferably cylindrical in shape, which has a relatively large chamber 2 at one end in which a piston 3 is axially movable. The movement and the position of this piston in the chamber 2 depend on the pressures and the piston areas on the two sides of the piston. As shown in FIG. 4, the two sides of piston 3 have different effective areas. On the side of the piston which has the smaller area (indicated in the drawing as $A_b$), the pressure ($P_s$) is assumed to be constant. On the other side of the piston having the larger area ($A_a$), the pressure ($P_a$) is dependent on the translational acceleration of the vehicle and the motion of the piston 3.

Control pressure $P_a$ can be provided in any suitable manner. Preferably a combination of fixed and variable orifices is used in which a part of the piston itself acts as the nozzle element of a flapper-jet nozzle type valve. Fluid under the constant supply pressure $P_s$ is admitted to the chamber 2 through the inlet 4 on the small area side ($A_b$) of the piston. This fluid then passes through a passage 5 in the piston and past a fixed orifice 6 to a nozzle discharge 7 in the end of a stem 8 formed integrally with the piston and extending slidably through the end wall of the chamber 2. The pressure $P_a$ between the fixed orifice 6 and the nozzle discharge 7 is admitted to the chamber 2 on the large area side ($A_a$) of the piston through ports 9 formed in the stem 8. This pressure $P_a$ varies according to the relative positions of a flapper 10 and of the nozzle 7 which together form a variable orifice. Flapper 10 suitably comprises a cantilever beam which can bend around a thin section 11 under acceleration forces acting on a seismic mass 12 at its free end.

It will be seen that the differential force resulting from differences in the piston area $A_a$ and $A_b$ and the pressures $P_s$ and $P_a$ tends to cause movement of the piston in the direction indicated by the arrow $y$. This differential force acting on the piston will vary depending upon the variations of the translational velocity $V_t$ with respect to time and will cause a displacement of the piston proportional to $\int \dot{V}_t dt$.

A fluid control pressure corresponding to the second term of Equation 4 is readily produced by means of a drag cup having a shaft 13 driven with the wheel to be braked and carrying a permanent magnet 14 which rotates in a drag cup 15. In the well-known operation of such a device, eddy currents are formed which cause the drag cup to be rotated from its initial position by an amount depending upon the spring constant of a suitable torsion spring 16, this amount of rotation being proportional to the speed of rotation of the rotor 14. The drag cup shaft carries a radial arm 17 which acts as a flapper in cooperation with the discharge nozzle 18 of a pressure chamber 19, fluid under the constant supply pressure $P_s$ being supplied to the upstream side of a fixed orifice 20. Accordingly, the pressure in the chamber 19 is proportional to the wheel rotational velocity $V_r$, and fluid under this pressure is conducted through a pipe 21 to a second chamber 22 formed in the body 1 of the control unit. Accordingly, the position of a suitable piston 23 in the chamber 22 is dependent on the pressure proportional to $V_r$, acting in opposition to a suitable spring 24.

Reference to Equation 4 shows that it remains to introduce into the system a value proportional to $V_{t0}$, or in other words to effect an initial setting of the piston 3 at the instant of brake application. Since at this instant $V_{t0}$ equals $V_r$ or $V_{r0}$, the fluid pressure developed in the chamber 19 can be utilized to obtain this initial setting of the piston 3, but must be rendered ineffective during the ensuing braking transient. For example, a conduit 25 leads from the conduit 21 referred to above to port 26 in the wall of a cylindrical bore containing a valve spool 27. Normally, the valve spool is maintained in the position shown in the drawing by a spring 28 so that fluid under pressure from the pipe 25 can pass from the port 26 to a port 29 and pipe 30 which conducts the fluid under pressure to an expansible and collapsible vessel 31, here shown as a corrugated bellows. Hence, by connecting the bellows 31 to the flapper 10, the flapper is positioned relative to the discharge nozzle 7 in accordance with $V_{t0}$ at all times up to the instant of brake application.

When the brake is applied, however, the brake operating pressure $P_1$ acts on the land 32 of the control valve 27 to move the valve spool to the right against the spring 28 until the land 33 closes the port 26, thereby disconnecting the pressure chamber 19 from the bellows 31. At the same time, the central land 34 of the valve spool opens the port 35 which is connected to the pipe 30, thereby venting the bellows 31 through the valve chamber to the exhaust port 36.

As stated above, the algebraic sum of the displacements of the pistons 3 and 23 can be obtained mechanically in any desired manner, but for present purposes it is preferred to provide the piston 3 with a sleeve 37 that is movable in a chamber 38 in the body 1 of the control unit, and to provide the piston 23 with a head 39 that is movable within the sleeve 37. In the normal position shown in the drawing, the piston head 39 covers a port 40 in the sleeve 37 and thus shuts off communication between the valve chamber 38 and a pipe 41 connected to the brake pressure system. As long as the relative positions of the piston head 39 and of the sleeve port 40 are maintained, therefore, the control unit has no effect on the brake operating pressure which is supplied, for example, through the orifice 42 and pipe 43 leading to any known brake operating means. Should the piston head 39 be displaced to the left (or right) relative to the sleeve port 40, however, the brake pressure in the pipe 43 can bleed off through pipe 41 and sleeve port 40 to the chamber 38 and its exhaust passage 44 in the body 1. Similarly, should the piston head 39 move to the right relative to the sleeve port 40, the brake operating pressure can bleed off into the chamber 38 at the left of the piston head and thence through suitable passages 45 in the piston head to the exhaust passage 44.

It should be understood that the optimum value of slip ratio that is to be maintained can vary somewhat depending upon conditions encountered in practice, both as to the supporting surfaces and the vehicle itself. In FIG. 1, the optimum or peak values under different road conditions are only approximately the same so that, to a certain extent, it is necessary to use an average value that should be close to but preferably not in excess of any of the peak values that may be encountered in service. Also, the curves shown in FIG. 1, while typical, do not necessarily apply to all vehicles, even assuming the same supporting surface. Thus, minor variations in the optimum value of S (or $k$) may occur in different cases.

It will be evident to those skilled in the art that a system embodying the invention can be used in various ways. For example, a single control system at any given wheel, in which a single vehicle translational velocity is compared with a single rotational velocity of the specific wheel, can be used if desired to control the brake pressure in the wheel cylinders of a group of braked wheels. Such a single system may be sufficient on vehicles having an all-wheel drive or transmission that prevents the wheels from locking or spinning independently, or such a drive or transmission for part but not all of the wheels (usually the rear wheels).

On the other hand, it may be preferable to employ separate control systems at each braked wheel so as to determine independently the slip ratios existing at each wheel. In such cases, the brake pressure can be independently controlled at each braked wheel, on the basis of the particular proportioned velocity difference at each wheel; or a brake pressure common to all braked wheels could be controlled on the basis of an average effect of the various proportional velocity differences at several wheels. Otherwise, the rotational velocity of each braked wheel could be measured and the average then compared with the translational velocity of the vehicle as a whole measured by integrating the translational acceleration of any desired particular point on the vehicle.

What is claimed is:

1. Means for controlling the fluid pressure in a pressure-operated braking system of a wheeled vehicle so as to maintain, during a braking transient, an approximately constant optimum value of the slip ratio $$\frac{V_t - V_r}{V_t}$$

between a wheel and its supporting surface, where $V_t$ is the vehicle translation velocity and $V_r$ is the wheel rotational velocity, said means including a brake pressure control valve openable to reduce the brake pressure in said system, and means for opening said valve when said slip ratio deviates in either direction from said optimum value comprising means responsive to vehicle translational acceleration for establishing a fluid pressure dependent thereon, a piston movable during a braking transient in response to said fluid pressure having a displacement proportional to the time integral of the vehicle transational acceleration, means responsive to wheel rotational velocity for establishing a fluid pressure proportional thereto, means for setting said first-named piston at the beginning of a braking transient to an initial position conforming to said pressure proportional to wheel rotational velocity, a second piston member movable during a braking transient in response to said fluid pressure proportional to wheel rotational velocity, and mechanical means for algebraically summing the movements of said piston-like members and opening said valve upon the existence of a difference between said movements.

2. Brake control means as defined in claim 1 including a source of substantially constant supply pressure, a differential area piston, means subjecting one side of said piston to said supply pressure, and means subjecting the other side of said piston to said fluid pressure dependent on the vehicle translational acceleration.

3. Brake control means as defined in claim 2, said means for establishing said fluid pressure comprising a fixed orifice supplied with said constant supply pressure and a variable orifice downstream relative to said fixed orifice, said variable orifice having a part movable during a braking transient in response to vehicle translational acceleration, said setting means comprising means for setting said movable part to an initial position at the beginning of a braking transient including a settling device responsive to said fluid pressure proportional to wheel rotational velocity and connected to said movable part, and means operative on brake application for venting said pressure responsive setting device.

4. Brake control means as defined in claim 2, said means for establishing said fluid pressure comprising a flapper-jet nozzle variable orifice and means for moving the flapper portion of said flapper-jet nozzle during a braking transient in response to vehicle translation acceleration, the jet portion of said flapper-jet nozzle being connected to said piston for movement therewith.

5. Brake control means as defined in claim 4, together with means for setting said flapper to an initial position at the beginning of a braking transient comprising a setting device responsive to said fluid pressure proportonal to wheel rotational velocity and connected to said flapper, and means actuated by braking pressure for venting said pressure responsive setting device on brake application.

6. Brake control means as defined in claim 1, said mechanical summing means comprising two elements one of which is movable with said piston and the other of which is movable with said second piston member, said elements being arranged for movement together while said slip ratio remains substantially constant at said optimum value but separating to open said valve in case said slip ratio deviates from said optimum value.

7. Brake control means as defined in claim 6, one of said elements comprising a sleeve secured to and movable with said piston and the other element comprising a piston head within said sleeve and connected to and movable with said second piston member, said sleeve having a port communicating with the brake pressure system and said head closing said port in the normal relative position of said members.

References Cited

UNITED STATES PATENTS 3,022,114   2/1962   Sampietro.
3,292,977   12/1966   Williams.

DUANE A. REGER, *Primary Examiner.*